United States Patent [19]

Sims et al.

[11] Patent Number: 5,656,156

[45] Date of Patent: Aug. 12, 1997

[54] FILTRATION SYSTEM FOR CLOSED CYCLE PARTS WASHER

[76] Inventors: Charles Sims, 126 Deanna St.; Don S. Culpepper, 15345 Willow Cir., both of Gulfport, Miss. 39503

[21] Appl. No.: 257,900

[22] Filed: Jun. 10, 1994

[51] Int. Cl.$^6$ ...................................................... B08B 3/02
[52] U.S. Cl. .................. 210/167; 210/196; 210/138; 210/416.1; 210/494.1; 134/111; 134/169 A; 134/110
[58] Field of Search ........................... 210/167, 168, 210/196, 805, 299, 138, 416.1, 416.5, 494.1, 497.1; 134/104.4, 109, 110, 111, 169 A, 182

[56] References Cited

U.S. PATENT DOCUMENTS

| | | |
|---|---|---|
| 2,570,021 | 10/1951 | Beach . |
| 2,746,467 | 5/1956 | Dempsey . |
| 2,771,086 | 11/1956 | Kearney . |
| 2,834,359 | 5/1958 | Kearney . |
| 2,842,143 | 8/1958 | Kearney . |
| 3,079,286 | 2/1963 | Kearney . |
| 3,085,948 | 4/1963 | Kearney . |
| 3,120,853 | 2/1964 | Kearney . |
| 4,157,096 | 6/1979 | Miller . |
| 4,379,467 | 4/1983 | Purr . |
| 4,392,891 | 7/1983 | Meyers . |
| 4,651,762 | 3/1987 | Bowden . |
| 4,784,169 | 11/1988 | Striedieck . |
| 4,824,567 | 4/1989 | Turman . |
| 4,855,023 | 8/1989 | Clark . |
| 4,869,820 | 9/1989 | Yee . |
| 4,954,222 | 9/1990 | Durr . |
| 5,080,791 | 1/1992 | Sims . |
| 5,271,850 | 12/1993 | Stutzman . |
| 5,273,060 | 12/1993 | Hill . |
| 5,349,974 | 9/1994 | Mansur . |
| 5,360,027 | 11/1994 | Harman . |
| 5,398,708 | 3/1995 | Sheldon . |
| 5,402,806 | 4/1995 | Hakeem . |
| 5,417,851 | 5/1995 | Yee . |

FOREIGN PATENT DOCUMENTS 2-97024  4/1990  Japan .

*Primary Examiner*—Thomas M. Lithgow
*Attorney, Agent, or Firm*—Pravel, Hewitt, Kimball & Krieger

[57] ABSTRACT

A solvent parts washer of the closed cycle type has an additional, independently controlled continuously cycled pump which recycles the solvent through a bypass filter. The pump has a suction inlet at the bottom of the parts washer bin and continuously passes a flow of solvent through the pass filter. This is one of a number of filters, commonly known as paper towel or paper roll filters, in which a liquid to be filtered is forced at a high pressure and low flow rate along the interstices between adjacent compacted sheets of a filtering medium. Such filter media and filters have relatively low flow rates because of their cleaning (filtering) capability is by absorption rather than screening, but have an exceptionally high ability to remove particles down to the sub-micron level from a filtered liquid. An agitator pipe in the solvent return flow serves to flush particulate contamination into the filter pump inlet. The invention maintains the solvent substantially free of contamination above the 0.5 micron level.

9 Claims, 3 Drawing Sheets

FILTRATION SYSTEM FOR CLOSED CYCLE PARTS WASHER

BACKGROUND OF THE INVENTION

This invention pertains to improvements in the construction of closed cycle parts washers of the kind which recirculate a cleaning solution or solvent from a sump onto a part to degrease and clean it.

Parts washers, which are capable of removing contaminants such as, oil and grease based dirts from metal or other parts which must be cleaned,, are widely used in such industries as automobile and truck repair, machine shops, manufacturing operations, shipboard (marine), oil field operations, aircraft and helicopter repair, construction, overhaul facilities and other facilities.

Parts washers are of a fairly uniform design: a sump containing cleaning solution is supported by legs or other supports. The washer is usually made of metal. Parts to be cleaned can be placed on racks within the sump to hold or support the parts. Some parts are held by hand, if desired. A recirculating pump, with some external control for actuation by the user, provides a continuing spray of the cleaning solution from the sump for flushing and cleaning the part.

For safety reasons, if the cleaning solution is a hydrocarbon solvent, the solvent is required to have a flashpoint of 104 degrees F. or higher. Since such solvents represent a significant flame hazard, parts washers of the types described are uniformly provided with a completely enclosing (metal) lid which is supported in the "up" position to provide access to the washer, but which includes some form of thermally sensitive or fusible link in the support so that if in the event of a flash fire, the link fails, dropping the lid across the bin, smothering the flames.

Environmental restrictions, especially on the disposal of hazardous waste products, require that such solvent be recirculated and reused. This poses obvious solvent contamination problems after the first use. The prior art has been to place various forms of filter in the line between the recirculating pump and the nozzle. However, as the recirculation pump is only activated when a spray is required for part cleaning, filtration only occurs for a short period of time during actual cleaning use. This has proven insufficient to remove residual contaminants and debris from the solvent, and the solvents still require periodic flushing, draining and replacement, all of which pose significant environmental problems to the use, storage, and disposal of the waste contaminated solvent.

SUMMARY OF THE INVENTION

The invention is an improvement to a standard model parts washer of the closed cycle type, the improvement comprising the addition of an independently controlled, continuously cycled pump and bypass filter. The pump has a suction inlet at the bottom of the parts washer bin and continuously passes a flow of cleaning solution through a so-called by pass filter. This can be any one of a number of filters, commonly known as paper towel or paper roll filters, in which a liquid to be filtered is forced at a high pressure and low flow rate along the interstices between adjacent compacted sheets of a filtering medium. Such filter media and filters have relatively low flow rates because their cleaning (filtering) capability is by absorption rather than screening, with an exceptionally high ability to remove particles down to the sub-micron level from a filtered liquid. This filtration action is in part a function of the flow path along the microscopically rough surface of adjacent filter element sheets.

The filtered liquid is preferably fed into the filter from the bottom; an optional sump in the bottom of the filter can then provide a settling space for the separation of water from the contaminated solvent. This water could be periodically drained through a sump plug or valve.

The return of the filtered cleaning solution is fed through an agitator tube placed in the base of the parts washer. It is typical in such a parts washer that a form of screen or mesh will be placed on the base, partly to trap large particulate solids which might otherwise contaminate the parts washer pump. The agitator tube is placed under this mesh. It comprises an elongate pipe running lengthwise the long dimension of the parts washer from edge to edge. The agitator tube has a periodically spaced series of holes along its length. The diameter of each of the holes is step tapered from one end of the tube to insure a uniform flow outward through the holes along the length of the agitator tube. This agitator assists in agitating and recirculating particles which fall out from the cleaning solution during cleaning and settle to the bottom of the sump, so that they will be picked up in the flow of cleaning solution into the bypass filter and removed from the solvent.

It is thus an object of this invention to show a filtration method for a closed cycle parts washer which continuously removes contaminants from the cleaning solution.

It is a further object of the invention to show a filtration system for a closed cycle parts washer which significantly extends the usable lifetime of the cleaning solution.

It is a further object of the invention to show an improved form of closed cycle parts washer having a significantly improved environmental benefit by reducing waste loss and disposal of otherwise contaminated cleaning solutions and solvents.

These and other objects of the invention can be more readily seen from the detailed description of the preferred embodiment which follows.

DETAILED DESCRIPTION OF THE INVENTION

Figure 1:
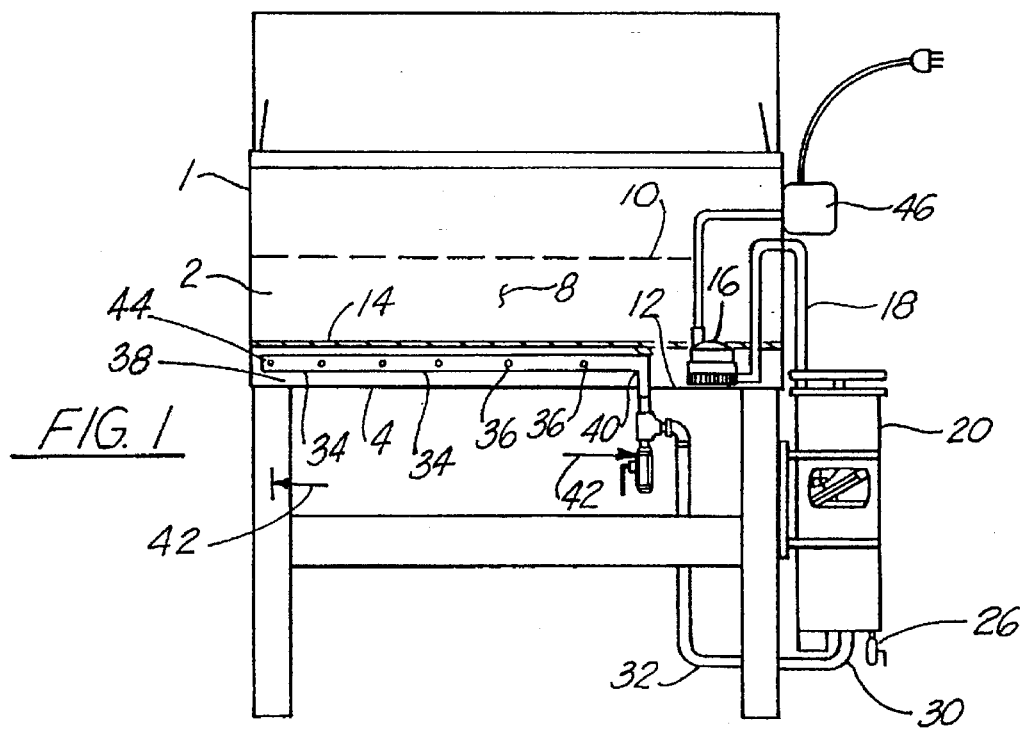
FIG. 1 is a cut away front view of a parts washer showing the improved filtration system installed thereupon.
Figure 2:
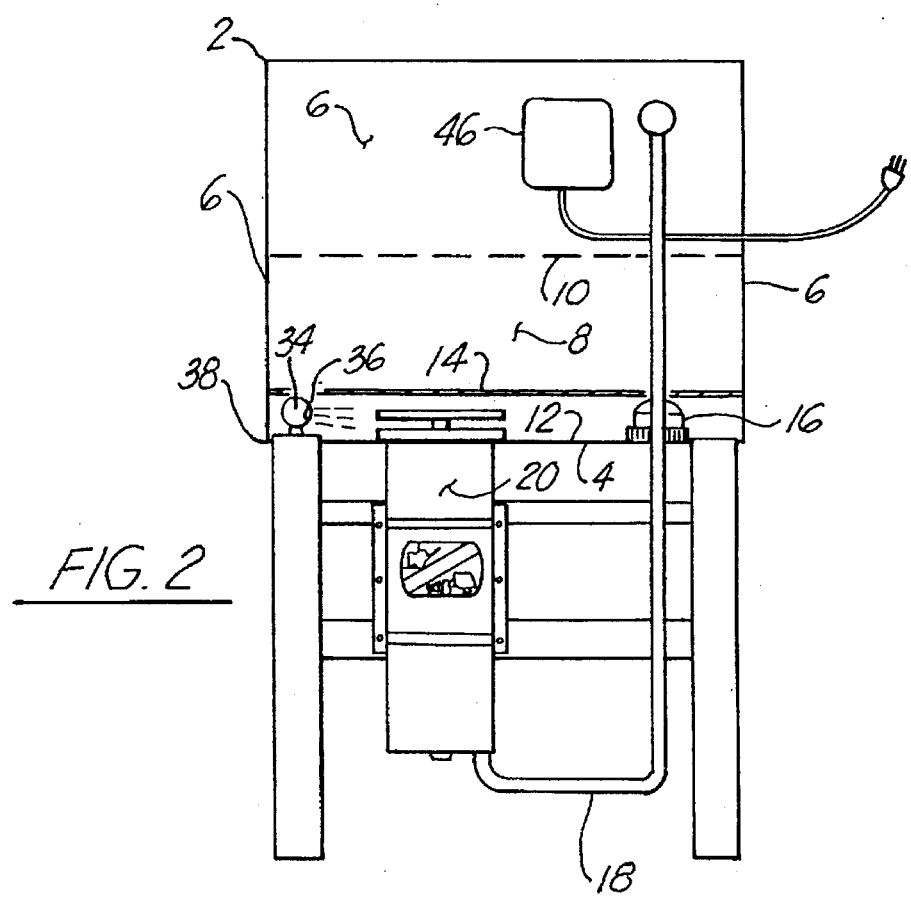
FIG. 2 is a side view of an improved parts washer.
Figure 3:
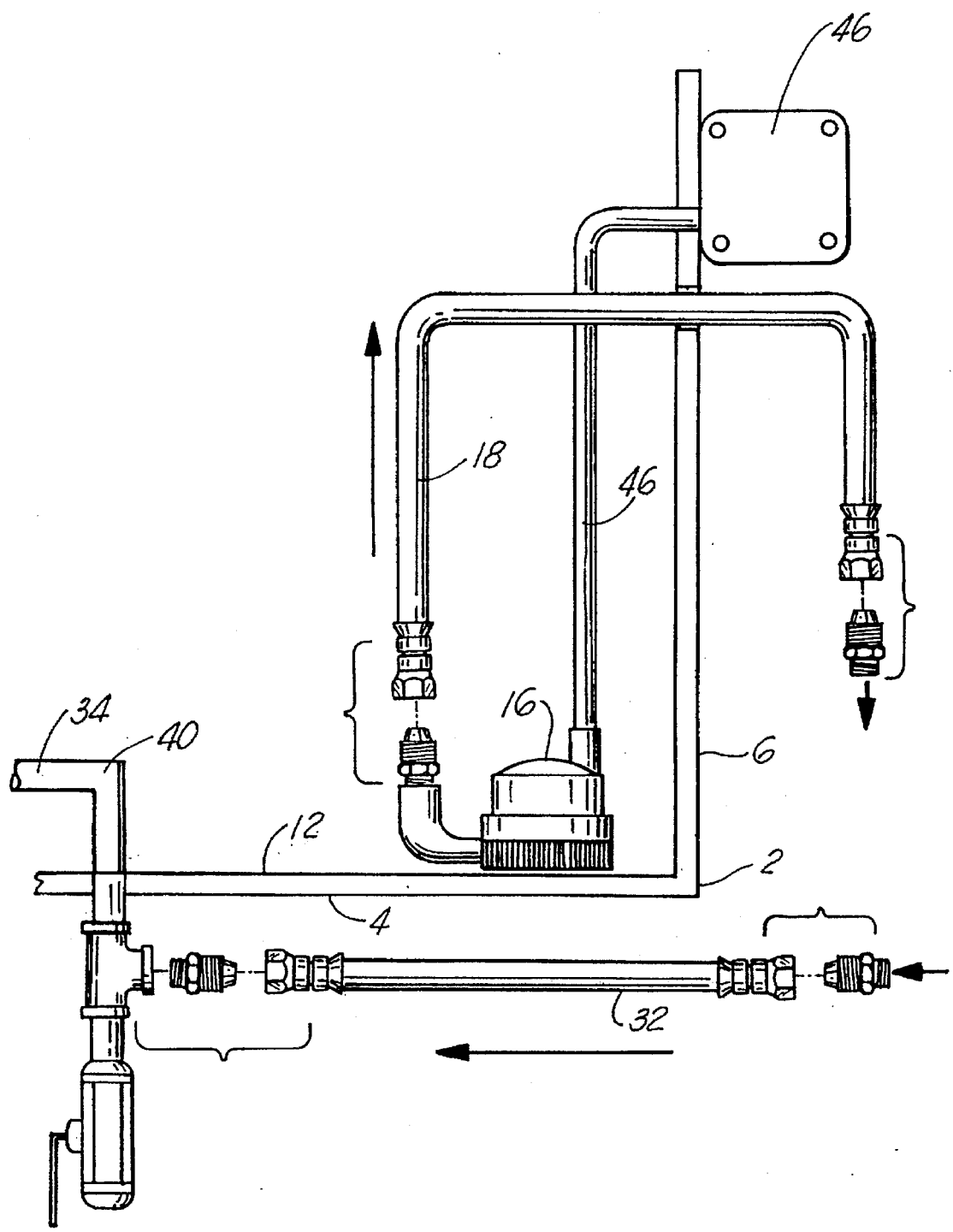
FIG. 3 is a sectional view showing details of the plumbing and controls for the improved parts washer.
Figure 4:
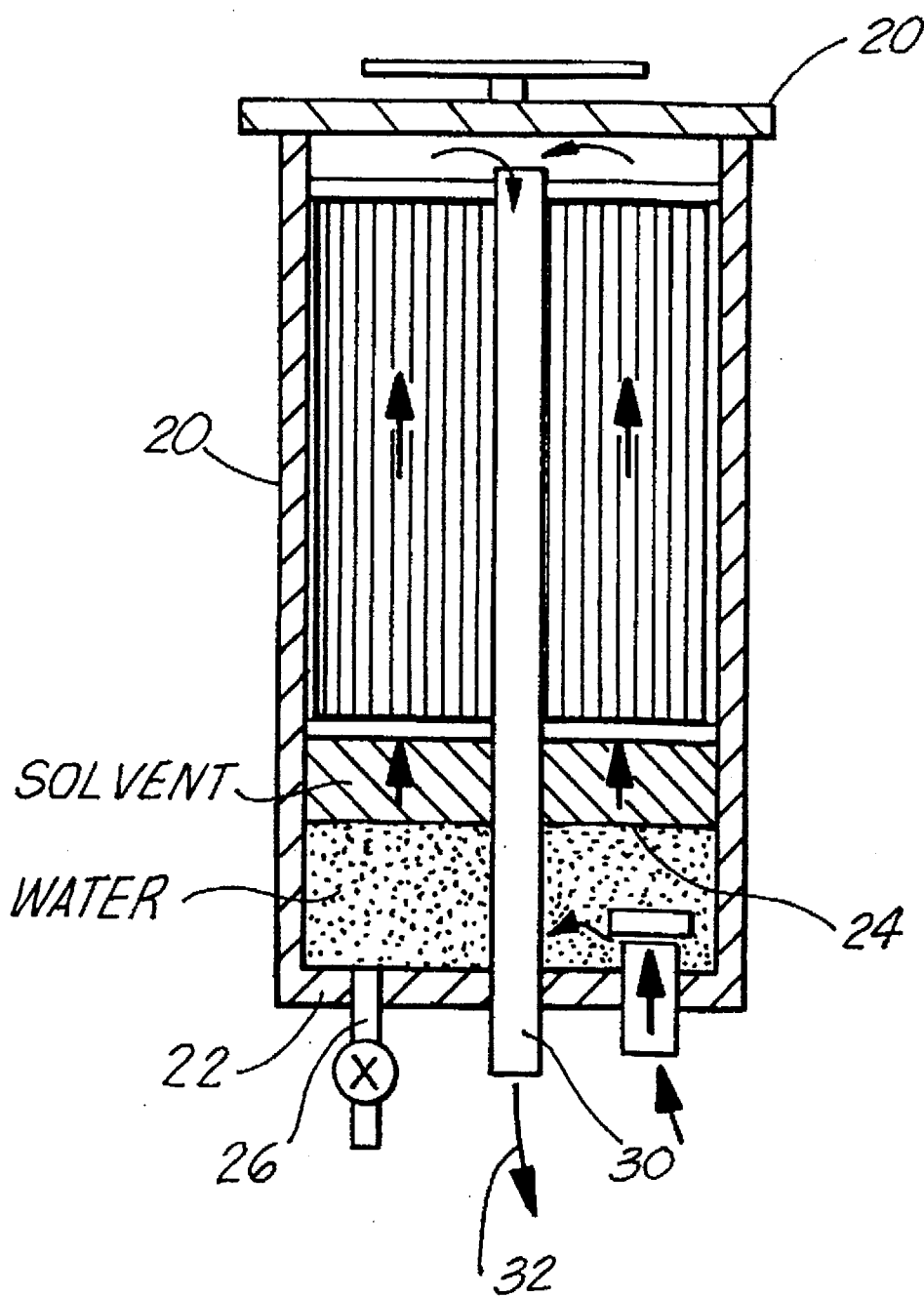
FIG. 4 is a view of a filter of the invention.

Referring to the figures, we show an exemplar parts washer 1 of the closed cycle type shown in outline. Such a parts washer 1 usually comprises a metal box 2 having a closed bottom 4 and sides 6 usually mounted on legs 8 for easy access. Not shown in the outline, but known by all those in the art to exist in such a box, is an internal explosion proof recirculating pump located in the sump at the bottom 4 of the box, and connected through a flexible metal hose to a nozzle within the box which may be aimed by the user at parts. Various trays and grids (not shown) are usually provided for installation within such a parts washer 1 for supporting parts during washing above the level 10 of the solvent. The box itself will be filled approximately one-half to two-thirds full with a cleaning solution which usually is a relatively high flash point hydrocarbon solvent. OSHA regulations require that the flashpoint be at least 104° F. Such solvents include, as an example, Stoddard standard solvent, a widely used OSHA accepted solvent. The base 8 of the parts washer box 2 is usually fitted with a thick open mesh material 14 which serves as a gross particulate filter 14 to prevent large particles of dirt and small parts from being sucked into the recirculating pump.

Flammable solvents 8 present a significant fire hazard; also, the evaporation of such solvent 8 present a significant environmental and safety hazard. Therefore, it is customary that the spray pump or recirculating pump will only be activated when a spray of solvent is actually required to clean a part; otherwise, the pump will be turned off, even when parts are being cleaned by being scrubbed with a brush dipped in the solvent pool.

The invention comprises an independent solvent recirculation and filtration system. As shown in the drawings, an explosion proof immersible pump 16 is placed in the base 8 or sump of the solvent box 2 at a low point for picking up a suction flow of solvent 8. The solvent 8 is then passed through recirculation piping 18 into a bypass filter 20. In preferred form, the solvent recirculation path is into the base 22 of the bypass filter 20 container, which contains an open settlement sump 24 which permits gravity separation of water and other non-solvent liquids, all of which are denser than a typical solvent, from the solvent. A provided sump drain 26 valve within the filter 20 casing permits these contaminating liquids to be drawn off. Water, which is one of the contaminated liquids to be drawn off, would normally be not found in the solvent, but because the solvent is washing parts that may have water contained on their surface, water may eventually become entrained in the solvent as a one of the contaminated particles or fluids that must be separated from the cleaning solvent.

The pump pressure then forces the cleaning solvent, as a separated upper layer within the sump 24, vertically through a bypass filter element of the paper towel or toiler paper type. Such a filter 20 filters by passing at a relatively high differential pressure, a relatively low flow rate of solvent through an elongate path between closely wrapped adjacent paper sheets. The fibrous surface nature of the adjoining paper sheets provides significant filtration down to the submicron level as the solvent passes along a meander path. In a test case installation of the invention, a filter 20 using paper towels was capable of removing substantially all particulate contamination 0.5 micron or greater in size. A suitable such filter is manufactured by Gulf Coast Filters, Inc. of Gulfport, Miss.

Further, the combination of the settlement sump 24 and the water absorptive nature of a paper towel filter element 28 removes substantially all water contamination from the solvent 8. The sump 24 is desirable; complete water contamination of the paper towel element 28 significantly reduces its filtration capabilities and causes the filter 20 to block. Thus, the paper element 28 must be changed more frequently if it is used alone to extract water.

The filtered solvent 8 is then drawn through an axial tube 30 centrally disposed within the filter 20 into a return flow line 32 which is then passed to a agitator pipe 34. The agitator pipe 34 is a metal pipe placed along a lengthwise elongate edge 38 on one side of the base 12 of the solvent box 2 of the parts washer 1. The pipe 34 is provided with a series of holes 36 along its length. The solvent 8 is fed into one end of the pipe. Typically, a series of 7/64 inch diameter holes 36 is provided along the pipe 34, spaced at one to one and a half inch intervals for about half the length 42 of the pipe 34. The hole diameter then decreases down to a series of 5/64 inch diameter holes 36 for the remaining length 42 of the pipe 34. It has been discovered that decreasing the diameter of the holes 36 in this manner is required in order to provide for a uniform flow of solvent 8 out of the pipe 34 along the entire length 42 of the pipe to the far end 44 which is capped off and sealed. Uniform hole sizes appear to result in most of the solvent 8 flowing from only a few of the holes 36 at one end of the pipe 34. As described, the agitator pipe 34 provides a sheet of solvent 8 flow across the base 12 of the solvent box 2 within the parts washer 1. This sheet flow picks up and removes to the filter pump 16 substantially all the contaminants which otherwise fall out or precipitate from the solvent 8.

The recirculating filter usually runs continuously to clean the solvent. However, the pump 16 for the solvent bypass filter may be controlled by an independent automatic timer 46 which is set for a cycle of on and off depended upon the usage rate of the parts washer. It has been determined that parts washers in light duty service may be completely cleaned if the timer 46 is set for a fifty percent duty cycle, typically thirty minutes on and thirty minutes off. Parts washers 1 having a heavy duty cycle and therefore very contaminated solvent are best served by a duty cycle above ninety percent; fifty minutes on and ten minutes off. Some periodic off time appears to improve filter performance. Thus, a timer 46 can be provided in lieu of simply running the pump continuously.

The filter pump 16 does however continue to filter the parts solvent 8 whether or not the parts washer 1 is in use. Thus filtration is completely independent of the operator's turning on and off the recirculating pump within the parts washer 1; a continuous low level of filtration occurs.

This is especially beneficial in that an effective bypass filter 20, capable of removing very fine contaminant of the micron and submicron level, has a natural trade-off in which the total flow rate through the filter decreases for a given pump pressure as the fineness of the filter, that is the fineness of the particles removed by the filter, increases.

Thus, the invention makes it practical to use a filter 20 optimized for removing very fine particles and contaminants from the solvent, whereas in the prior art such a filter 20 would not provide a sufficient flow rate to be placed in line with the spray nozzle for effective cleaning. By continuous or near continuous running of the filtration pump, the solvent 8, is continuously cleaned of particles down to and below 0.5 micron level. As a result, even after extensive use, it has been found that the solvent 8 presented for cleaning parts is as clean as fresh solvent. Further, since water is removed by the invention, as well as other liquid contaminants, it is seldom necessary to dump the solvent from the parts bin and replace it with fresh solvent to maintain effective cleaning. This is proven particularly critical when cleaning precise items such as valve components for transmissions, diesel fuel injectors and pumps, and components using in flight-critical areas, such as airplanes and helicopters, and other close tolerance machine parts which are very sensitive to small abrasive contaminants and which require extraordinarily clean solvent to be effectively cleaned.

As a result, it has been discovered that the use of the filter 20 and the filter system of the invention eliminates or significantly reduces the requirement to dump used solvent from the parts washer and replace it with fresh solvent. This in turn significantly reduces the economic and environmental problems posed by the disposal of contaminated cleaning solvents. It also reduces the consumption of such raw materials used in making various cleaning solvents further easing the economic impact of the solvent washers. Finally, by maintaining a uniformly clean solvent bath within a parts washer, a secondary effect occurs. The smallest particle seen by the human eye is forty (40) microns. It is widely agreed that 60% of the wear in an automobile engine is caused by particles in the 1 to 20 micron range. Dirty solvent containing these microscopic particles cannot be seen by the eye. Such precisive and high tolerance parts are washed in cleaner solvent by the invention than typically is the case in a recirculated solvent washer. These parts, being cleaned more effectively from small abrasive components thus enjoy an extended life plan and less wear, reducing ultimately the cost of repair and replacement for the end item for which the parts are attached.

It can thus be seen that the invention, which in its broadest form is the provision of a continuously running or nearly continuously running bypass filter on a closed cycle solvent parts washer, provides a significant and unique improvement not hithertofor seen in the operation of such parts washers.

I claim:

1. A recirculating solution parts washer comprising:

means for cleaning said parts;

a first sump for holding a cleaning solution which would be used for cleaning parts;

a pump, connected for fluid flow from the first sump to a fine particle filter, return means for connecting the filter for return fluid flow back to said first sump;

a pipe means connected to said return means and extending along an edge of said first sump, said pipe means further comprising a plurality of perforations in said pipe having periodically decreasing diameters, for emitting an even outflow of solvent along a base of said first sump.

2. The apparatus of claim 1 further comprising:

said pump operating continuously.

3. The apparatus of claim 1 further comprising:

a timer controlling the operating cycle of said pump.

4. The apparatus of claim 1 further comprising:

said filter comprising a paper towel filter.

5. The apparatus of claim 1 further comprising:

said filter comprising:

a second sump for separation of water from the cleaning solution:

a filter element which passes said cleaning solution between and along closely spaced filter element surfaces having micron sized fibrous protrusions.

6. The apparatus of claim 1, wherein said pipe means forms a sheet flow of returned solvent across said first sump for moving particulate contaminants into said pump.

7. A recirculating solution parts washer comprising:

means for cleaning said parts;

a first sump for holding a cleaning solution which would be used for cleaning parts;

a pump, connected for fluid flow from the first sump to a fine particle filter, said filter further comprising a separation sump for separation of water from the cleaning solution;

said pump operating substantially continuously for solvent flow through said filter;

said filter being connected for fluid flow to a perforate pipe extending along an edge of said first sump connected for receiving fluid flow from said filter; and perforations having periodically decreasing diameters in said pipe, for emitting an even outflow of solvent along a base of said first sump.

8. The apparatus of claim 7, said substantial continuous operation of the pump comprising a pump duty cycle of at least fifty percent operation.

9. An improved filtration system for a recirculating solution parts washer comprising:

a first sump for holding a cleaning solution which would be used for cleaning parts in the parts washer;

a pump, connected for fluid flow from the first sump to a fine particle filter, said filter further comprising a second sump for separation of water from the cleaning solution;

said pump operating substantially continuously for solvent flow through said filter;

said filter being connected for fluid flow to a perforate pipe extending along an edge of said sump connected for receiving fluid flow from said filter;

said perforate pipe having a plurality of perforations with decreasing diameters, for emitting an even outflow of solvent along a base of said first sump and forming a sheet flow of return solvent across said first sump for moving particular contaminants into said pump.

* * * * *